United States Patent [19]

Jeffries et al.

[11] 4,314,099

[45] Feb. 2, 1982

[54] FLUID-INSULATED UNIVERSAL FLEXIBLE ACOUSTIC COUPLER MUFF SYSTEM

[75] Inventors: John A. Jeffries; Mark H. Ruch, both of Austin, Tex.

[73] Assignee: Texas Instruments Incorporated, Dallas, Tex.

[21] Appl. No.: 90,726

[22] Filed: Nov. 2, 1979

[51] Int. Cl.³ .............................................. H04M 1/14
[52] U.S. Cl. ................................................... 179/1 C
[58] Field of Search ............... 179/1 E, 1 C, 2 C, 180; 181/146, 151, 163

[56] References Cited

U.S. PATENT DOCUMENTS

| | | | |
|---|---|---|---|
| 3,733,437 | 5/1973 | Keith | 179/1 C |
| 3,992,583 | 11/1976 | Davis et al. | 179/1 C |

*Primary Examiner*—Raymond F. Cardillo, Jr.
*Assistant Examiner*—J. A. Popek
*Attorney, Agent, or Firm*—Thomas G. Devine; Melvin Sharp; Rhys Merrett

[57] ABSTRACT

A universal acoustic coupler system includes a pair of flexible muffs for acoustically coupling a telephone handset to transducers (speaker/microphone) of an electronic input/output device. The muffs are formed of an external housing inside which an internal housing is positioned, defining a fluid insulator therebetween. The internal housing has a speaker/microphone cavity for receiving the input/output device speaker or microphone which opens into an earpiece/mouthpiece cavity for receiving the earpiece or mouthpiece of a telephone handset. The fluid insulator is formed to completely insulate the speaker or microphone to eliminate all external noise.

10 Claims, 5 Drawing Figures

FLUID-INSULATED UNIVERSAL FLEXIBLE ACOUSTIC COUPLER MUFF SYSTEM

BACKGROUND OF THE INVENTION

1. Field of the Invention

This invention relates to acoustic couplers and more particularly to universal, fluid insulated flexible acoustic muff systems.

2. Description of the Prior Art

An ordinary telephone can be used to connect a portable data terminal to a remote computer by lifting the telephone handset from its cradle and placing it on a handset-holding assembly of the data terminal. A microphone and speaker of the data terminal are then acoustically coupled to the earpiece and mouthpiece, respectively, of the handset. Although this type of acoustic coupling allows rapid connection to a telephone line, it can result in a high level of extra noise. The noise can arise from extraneous sounds and vibrations entering the microphone of the handset or terminal. One prior art design is the subject of U.S. Pat. No. 3,992,583, which is assigned to the assignee of this invention. Another design with primary emphasis on reducing external noise is described in U.S. Pat. No. 3,733,437, which describes an elastomeric coupling member having an inner wall for snugly receiving one end of the handset and an outer wall which concentrically surrounds the inner wall with a space provided between them. A thin annular membrane couples the upper ends of the inner and outer walls. The space between the inner and outer wall is maintained to prevent the inner wall from mechanical vibrations impressed on the outer wall.

BRIEF SUMMARY OF THE INVENTION

In accordance with the invention, fluid-insulated, resilient coupling muffs are provided for coupling a telephone handset to transducers of a data terminal. The muffs are flexibly mounted to accommodate varying center distances between earpieces and mouthpieces of telephone handsets. Also, the earpiece/mouthpiece cavity of the muff is elastic and provided with a flange to enable close fitting of the earpiece or mouthpiece of any commercially available telephone, on an international scale. The muffs each include an external housing and an internal housing. The internal housing is positioned within the external housing to form space for a fluid insulator between the inside wall of the external housing and the outside wall of the internal housing completely surrounding the internal housing up to the point of the opening of the earpiece/mouthpiece cavity. The internal housing also includes a speaker/microphone cavity for receiving the transducers of an electronic input/output device, such cavity opening into the earpiece/mouthpiece cavity. The fluid insulator completely surrounds the speaker or microphone of the electronic input/output device. This structure enable transmitting and receiving data at a 1200 Baud rate. This compares with a 300 Baud rate attainable in prior art acoustic coupler muffs.

A primary objective of this invention, therefore, is the attenuation of mechanical noise of a sufficient degree to permit high speed data transmission to take place via an acoustic coupler.

Another object of this invention is to provide high speed data transmission with an on-board modem for acoustic coupling to a telephone line through the handset.

Still another object of this invention is to provide an on-board 1200 Baud acoustic coupler for a data terminal.

These and other objects are exemplified and described in the detailed description that follows.

DETAILED DESCRIPTION OF THE INVENTION

Figure 1A:
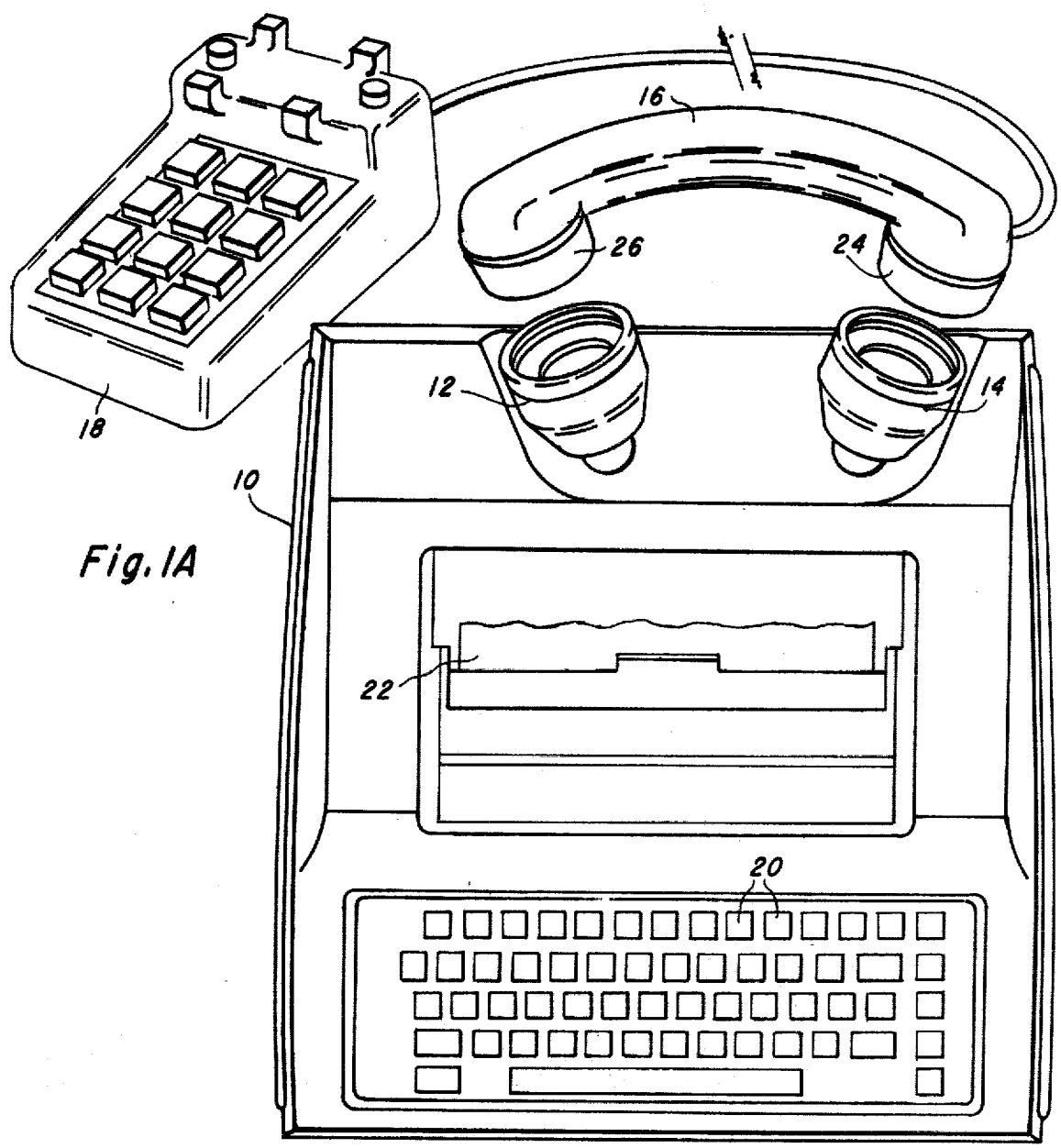
FIGS. 1a and 1b illustrate a top and side view, respectively, of an electronic input/output device utilizing the fluid-insulated universal flexible acoustic coupler muff system according to the present invention.
Figure 1B:
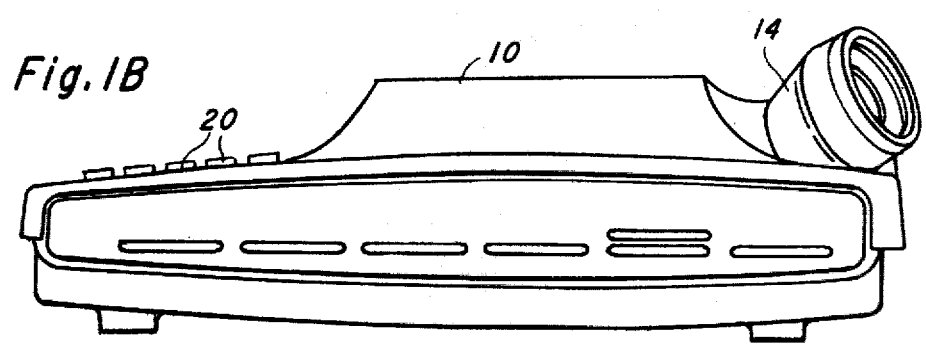

Referring now to FIGS. 1a and 1b, there is illustrated an electronic input/output device or portable data terminal 10 which is coupled through acoustic muffs 12 and 14 to telephone handset 16. The telephone handset 16 is in turn coupled to telephone 18 which interconnects terminal 10 by way of the telephone lines to a computer (not shown). Terminal 10 is normally portable and allows an operator to gain access to and receive information from a computer through the nearest available telephone 18.

When information is to be transmitted to the computer, an operator types on keyboard 20 the information to be transmitted which is also visually recorded on paper 22. Terminal 10 converts the information into a digital/audio signal which is transmitted by the speaker/mouthpiece muff 14 to the mouthpiece 24 of handset 16. Conversely, when information is to be obtained from the computer, terminal 10 accesses the computer, and the information is transmitted over the telephone lines, through earpiece 26 of handset 16, through the microphone/earpiece muff 12, and terminal 10 converts the information into readable form on paper 22.

Figure 2A:
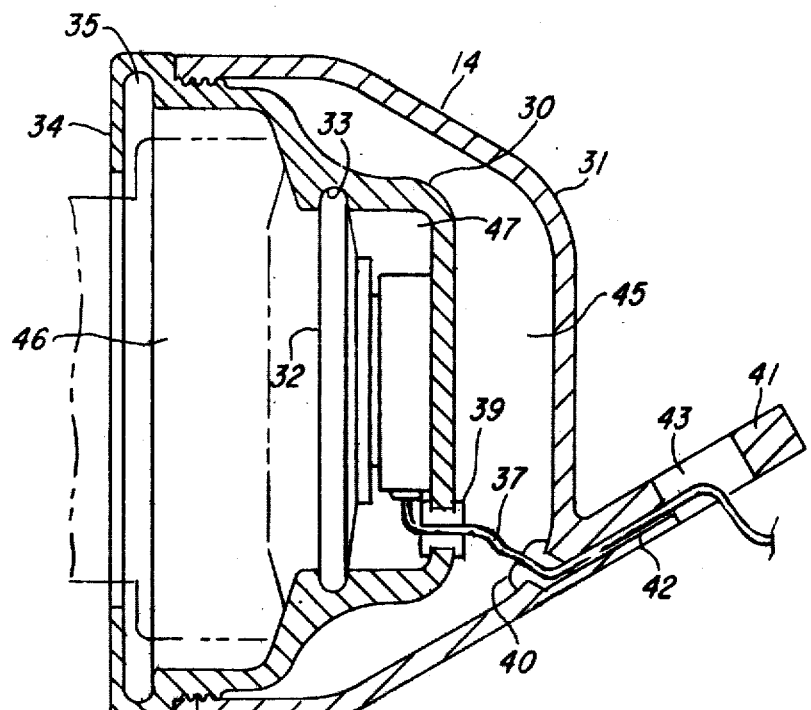
FIG. 2a illustrates a cut-away side view of the speaker/mouthpiece acoustic muff.

FIG. 2a illustrates the internal housing 30 positioned within external housing 31 of muff 14 and secured by way of threads 48. Internal housing 30 has circumferential flange 34 as an integral part thereof in defining the opening to earpiece/mouthpiece cavity 46. Circumferential groove 35 is formed in internal housing 30 immediately adjacent and behind flange 34 to facilitate the bending of flange 34 to accommodate a telephone earpiece or mouthpiece larger than the opening defined by flange 34. Earpiece/mouthpiece cavity 46 is further defined by ledge 36 which forms the end wall of cavity 46 and defines the opening into speaker/microphone cavity 47. In this preferred embodiment, ledge 36 is inclined at 20° from the plane of flange 34. It has been found that this angle accommodates the earpiece or mouthpiece configuration of the typical telephone handset. Also, the dimension of flange 34 is such that the smallest commercially available earpiece or mouthpiece of a telephone handset, as well as the largest commercially available earpiece or mouthpiece, will fit into cavity 46, bending flange 34 inwardly until seating against ledge 36.

Speaker 32 fits into circumferential groove 33 formed in speaker/microphone cavity 47. Electrical leads 37 from speaker 32 pass through opening 38 in internal housing 30, sealed by seal 39. Leads 37 pass through seal 40 into passage 42 and out through mounting hole 43 of flexible mounting arm 41.

Fluid insulator 45, defined by the space between internal housing 30 and external housing 31, in the preferred embodiment is dimethylpolysiloxane, a silicon fluid, supplied by Dow Corning as "200 Fluid". As can be seen in FIG. 2a, speaker 33 is completely isolated by silicon fluid 45.

In another preferred embodiment, the fluid 45 is air.

Figure 2B:
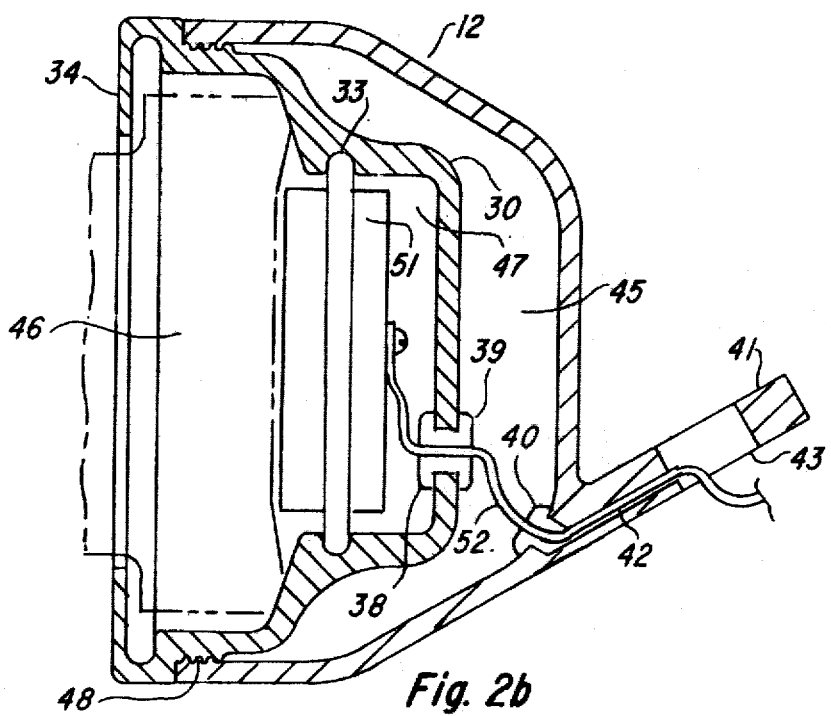
FIG. 2b illustrates a cut-away side view of the microphone/earpiece acoustic buff.

FIG. 2b illustrates a structure identical to FIG. 2a except that instead of speaker 32, microphone 51 is provided, secured by groove 33. Electrical leads to microphone 51 are sealed in the same manner as described with respect to FIG. 2a and pass out through pressure 42 in flexible mounting arm 41. In the configuration shown in FIG. 2b, the mouthpiece 26 would be inserted into cavity 46.

Figure 2C:
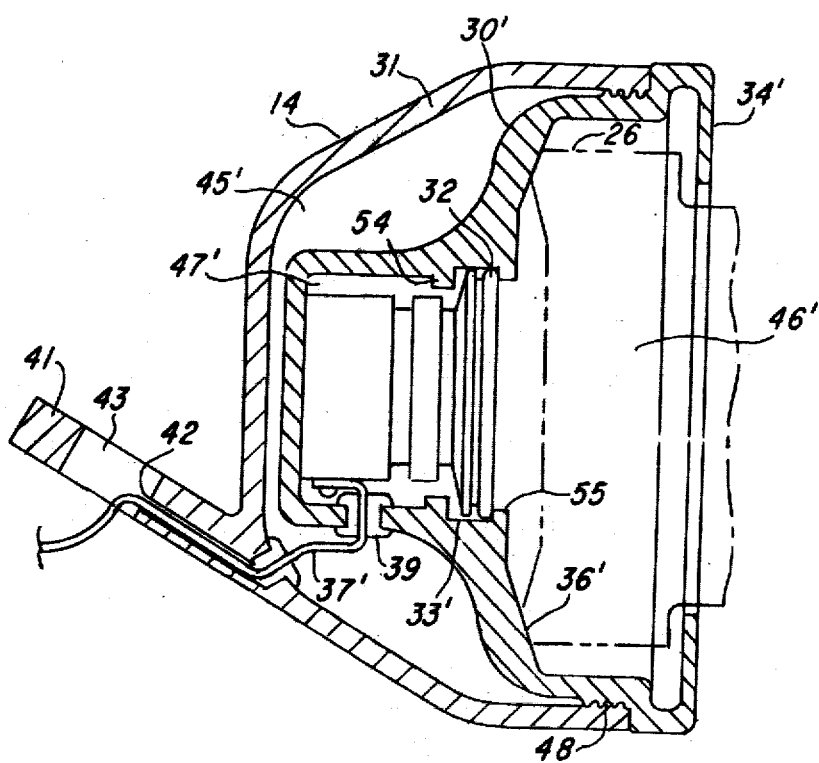
FIG. 2c illustrates a cut-away side view of the speaker/mouthpiece acoustic muff utilizing another embodiment of the internal housing.

FIG. 2c illustrates a modified internal housing 30[1] differing from internal housing 30 to accommodate a particular speaker 32[1]. The main difference is that groove 33[1] is defined by circumferential ridges 54 and 55 with speaker/microphone cavity 47[1] being deeper, and smaller in diameter than cavity 47.

Internal housing 30[1] is secured within external housing 31 in the same fashion as indicated above, through threads 48. In all other respects, the assembly of FIG. 2c is identical to that of FIG. 2a.

PREFERRED MODE OF OPERATION

The operation is simply described by stating that mouthpiece 24 of handset 16 is inserted into the structure shown in FIG. 2b and the earpiece 26 of handset 16 is inserted into a muff of either FIG. 2a or of FIG. 2c. In this manner, if a message is to be transmitted, mouthpiece 24 provides audible exitation for microphone 51 which in turn provides an electrical signal over electrical conductors 52. When information is to be received, electrical signals come in over electrical conductors 37 of FIG. 2a or 37[1] of FIG. 2c to speaker 32 of FIG. 2a or speaker 32[1] of FIG. 2c, respectively. The acoustic vibrations set up by speaker 32 or 32[1] is picked up by earpiece 26 of handset 16 and transmits that to terminal 10.

In this preferred embodiment, the muff assembly is made of a flexible elastic thermoplastic rubber, e.g., Kraton, manufactured and sold by Shell Oil Company. The microphone is manufactured by Astatic Company and the speakers are manufactured by Turner. These particular components are illustrative only and of course do not limit the invention.

Although the present invention has been shown and illustrated in terms of a specific apparatus, it will be apparent that changes or modifications can be made without departing from the spirit and scope of the invention as defined by the appended claims.

We claim:

1. A universal acoustic muff adapted to enclose a speaker or a microphone, for receiving an earpiece or mouthpiece of a telephone handset, comprising:
   (a) an external housing having an aperture;
   (b) an internal housing having a speaker/microphone cavity for receiving the speaker or microphone, opening into an earpiece/mouthpiece cavity, positioned within the external housing so that the earpiece/mouthpiece cavity opens into the external housing aperture, and further comprising a flexible, peripheral flange surrounding the earpiece/mouthpiece cavity, the flange being sufficiently large to enclose the earpiece or mouthpiece of any available telephone handset; and
   (c) a fluid insulator formed between the inner surface of the external housing and the outer surface of the internal housing for attenuating outside mechanical noise.

2. The muff of claim 1 wherein the flange is formed to flex inwardly at a dimension large enough to accommodate any available telephone handset.

3. The muff of claim 1 wherein the earpiece or a mouthpiece seats against the ledge in the earpiece/mouthpiece cavity surrounding the opening to the speaker/microphone cavity and forming an end wall of the earpiece/mouthpiece cavity.

4. The muff of claim 3 wherein the ledge is formed at an angle of approximately 20° with respect to the plane of the flange, sloping inwardly from the earpiece/mouthpiece cavity toward the speaker/microphone cavity.

5. The muff of claim 1 wherein the fluid insulator compresses air.

6. The muff of claim 1 wherein the fluid insulator comprises silicone fluid.

7. The muff of claim 1 wherein the external and internal housing are made of an elastic material.

8. The muff of claim 7 wherein the elastic material comprises thermoplastic rubber.

9. The muff of claim 1 wherein the housings are generally circular and the internal housing has an annular groove formed at the opening between the earpiece/mouthpiece cavity and the speaker/microphone cavity to secure the speaker or microphone.

10. The muff of claim 1 wherein the housings are generally circular and the internal housing has a pair of spaced apart annular ridges, forming a groove therebetween at the opening between the earpiece/mouthpiece cavity and the speaker/mouthpiece cavity to secure the speaker.

* * * * *